Oct. 18, 1966  C. T. MANZ  3,278,943
MOVABLE TRANSPARENT SHUTTER FOR A WELDER'S HELMET
Filed June 1, 1964  2 Sheets-Sheet 1
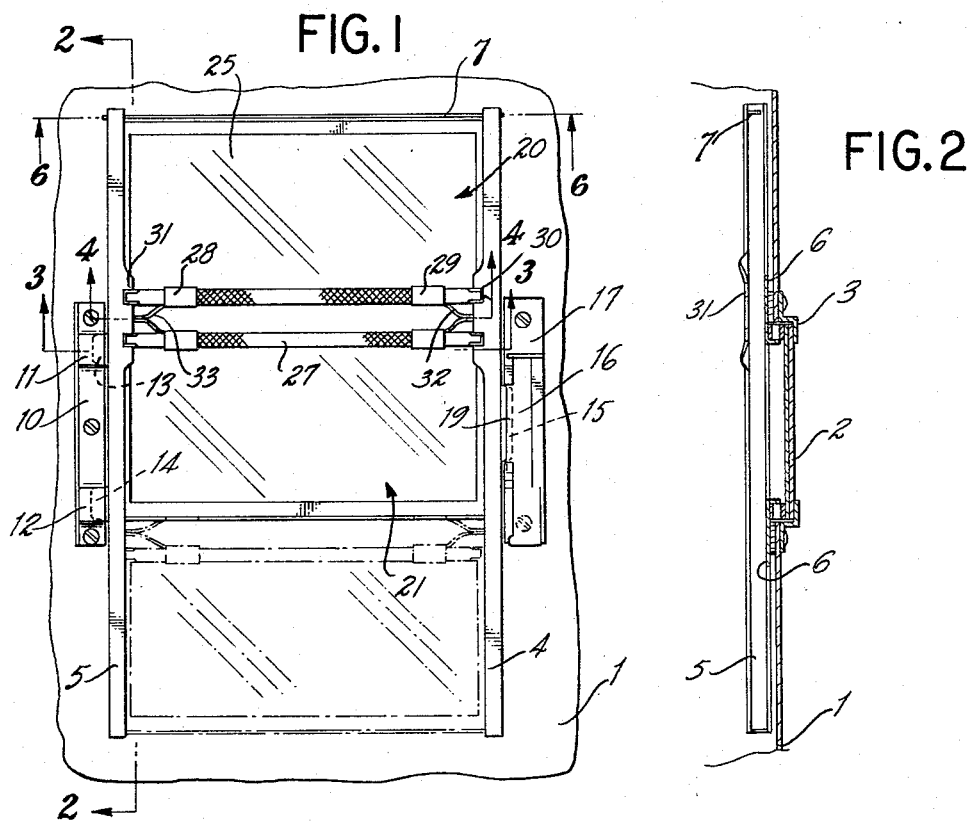
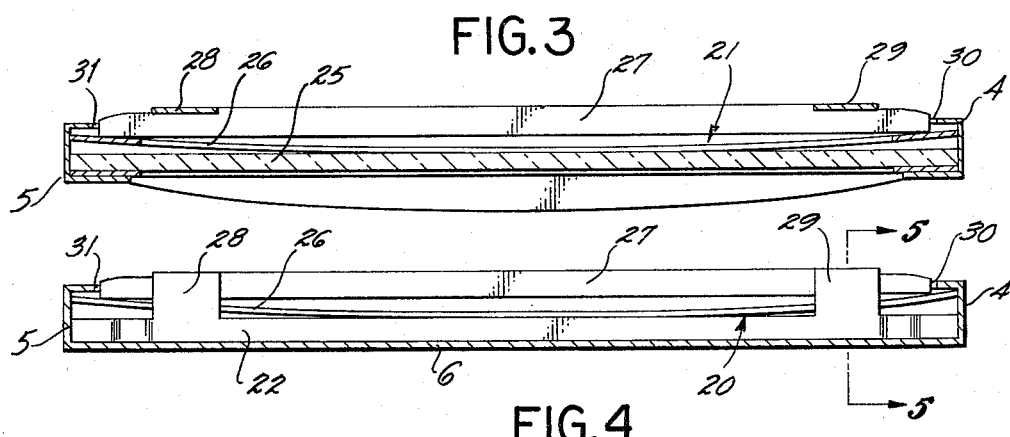
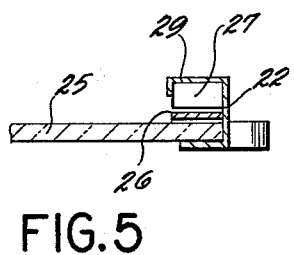
INVENTOR.
CURTIS T. MANZ
BY
ATTORNEY Oct. 18, 1966 C. T. MANZ 3,278,943
MOVABLE TRANSPARENT SHUTTER FOR A WELDER'S HELMET
Filed June 1, 1964 2 Sheets-Sheet 2
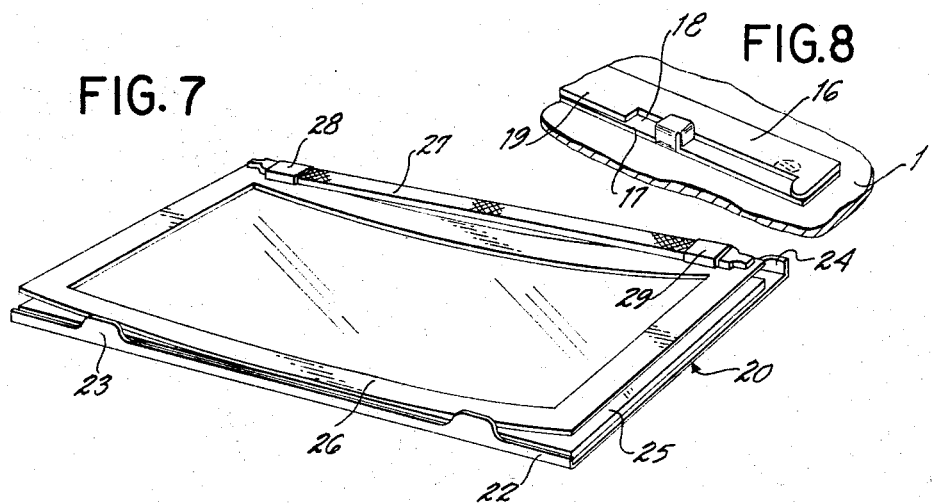
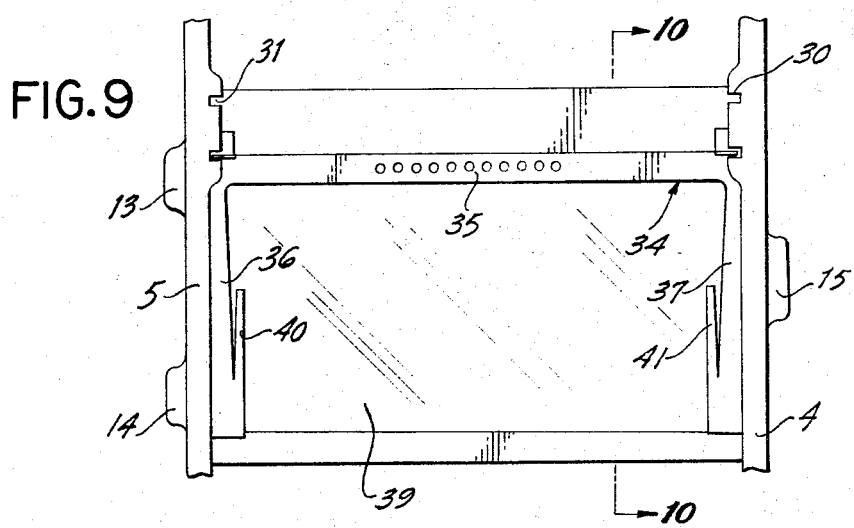
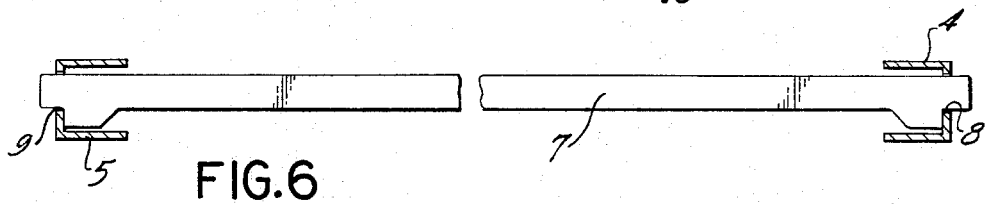
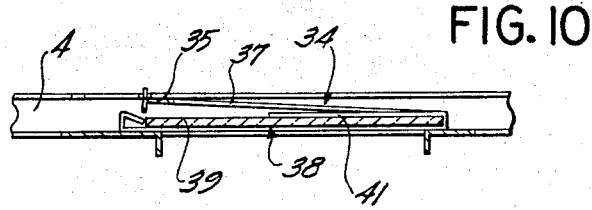
INVENTOR.
CURTIS T. MANZ
BY
ATTORNEY 3,278,943
MOVABLE TRANSPARENT SHUTTER FOR A
WELDER'S HELMET
Curtis T. Manz, P.O. Box 2466, Long Beach, Calif.
Filed June 1, 1964, Ser. No. 371,292
3 Claims. (Cl. 2—8)

This invention relates to a movable transparent shutter for a welder's helmet whereby it is possible for the welder to move a glass pane of different colors or density to shield the eyes from certain dangerous light rays emitted by a welding torch, or by the welding flame.

An object of my invention is to provide a novel removable track in a welder's helmet, and one or more movable or removable shutters which carry a transparent or colored glass of different densities to exclude certain dangerous light rays from the eyes of the wearer.

Another object of my invention is to provide a novel device of the character stated, in which the shutter or shutters are selectively movable into a position opposite the eyes of the wearer so that certain dangerous light rays may be deflected or absorbed.

Another object of my invention is to provide a device of the character stated in which the various shutters may be manually moved from a position adjacent the usual eye glass in a welder's helmet, to a position covering that eye glass as determined by the user, so that glasses of different density or color may be moved to a position opposite the eyes of the user to protect the eyes against dangerous light rays.

Still another object is to provide a device of the character stated in which the various movable shutters may be entirely removed from the track for purposes of replacement or repair.

A feature of my invention resides in the means whereby the movable track may be entirely removed from the welder's helmet if desired, whereupon the helmet is provided only with a protective glass as, for example, the workman is using a grinding or buffing machine.

Other objects, advantages and features of invention may appear from the accompanying drawings, the subjoined detailed description and the appended claims.

In the drawings:

FIGURE 1 is an elevation as viewed from the inside of the welder's helmet and showing my shutter construction in position within the welder's helmet.

FIGURE 2 is a fragmentary vertical sectional view taken on line 2—2 of FIGURE 1.

FIGURE 3 is an enlarged transverse sectional view taken on line 3—3 of FIGURE 1.

FIGURE 4 is an enlarged transverse sectional view taken on line 4—4 of FIGURE 1.

FIGURE 5 is a fragmentary horizontal sectional view taken through one arm of the guide track.

FIGURE 6 is an enlarged transverse sectional view taken on line 6—6 of FIGURE 1.

FIGURE 7 is a perspective view of one of the shutters.

FIGURE 8 is a perspective view of the latch which engages the track assembly.

FIGURE 9 is a fragmentary top plan view of a modified form of shutter assembly.

FIGURE 10 is a horizontal sectional view taken on line 10—10 of FIGURE 9.

Referring more particularly to the drawing, the numeral 1 indicates a welder's helmet of usual and well known construction, and which includes a window 2 fitted in a rectangular metal frame 3 which is attached to the outside of the helmet 1. The glass or window 2 is usually formed of clear glass and is intended to protect the eyes against flying particles as, for example, when the workman is wearing the helmet while engaged in a grinding or buffing operation.

The welder's helmet 1 is also used while the workman is engaged in welding and, consequently, it is necessary to move a window or shutter over the window 2 in order to protect the welder's eyes from dangerous light rays which are emitted by the welder's torch or the welding arc. In order that glass windows or shutters of different colors or density may be placed over the window 2, I provide an assembly consisting of a pair of parallel tracks 4–5, which tracks are each channel-shaped in cross-section, and are connected to form a unitary structure by transverse webs 6, which are arranged between the ends of the track. A bar 7 is shown in FIGURE 6 and extends between the tracks 4–5 at one or both ends thereof, for the purpose of closing the ends of the track and to prevent accidental removal of the shutters, as will be subsequently described. The bar 7 is formed of thin flexible metal and can be bowed outwardly to remove the ends of the bar from the holes 8 and 9 in the rails 4–5 respectively, thus enabling the shutters to be removed when replacement or repair is necessary.

To hold the rails 4–5 in position on the inside of the welder's helmet 1, I provide a metal strip 10 which is fixedly attached to the helmet 1 adjacent the rail 5. The strip 10 is formed with two upwardly bent sockets 11–12 and the rail 5 is provided with two outwardly extending lugs 13–14 which fit into the sockets 11–12 respectively. This construction will hold one side of the rail assembly in position. The other side of the rail assembly is held in position in the helmet by means of an outwardly extending lug 15 on the rail 4. The lug 15 is engaged by a sliding latch 16 which is fixedly mounted on the inside of the helmet 1 adjacent the rail 4. The latch 16 is slidably mounted on a metal strip 17 and is also formed with an elongated notch 18 in which the lug 15 fits in the open position of the latch. When the latch is closed a lip 19 engages the lug 15 to hold the rail assembly in fixed position within the welder's helmet.

Between the rails 4–5 I provide a pair of manually slidable shutters 20 and 21, which are identical in construction and can be moved manually by the workman on the rails 4–5 to a position covering the window 2; that is, the shutter 21 can be pushed upwardly to cover the window 2, or the shutter 20 can be pushed downwardly to cover that same window. Since the shutters 20 and 21 are identical, only one will be described in detail. A rectangular metal frame 22 is formed with upwardly projecting lugs 23 on one side, and upwardly projecting lugs 24 on the other side, thus providing a trough in which the colored plate 25 of transparent glass is mounted.

A rectangular flat spring 26 rests on top of the colored pane 25 and within the rectangular metal frame 22. This rectangular spring tends to hold the glass pane 25 downwardly within the frame 22 and also is part of the frame latching means, as will be subsequently described.

A latch bar 27 extends across one end of the frame 22 and is held in position by means of two channel-shaped guides 28 and 29, which are integrally formed with the frame 22 and extend upwardly from this frame. The bar 27 fits closely within the guides 28–29 to permit limited vertical movement of the latch bar 27, but still permitting this bar to be pressed upwardly into latching position. The rail 4 is formed with a notch 30 to receive one end of the latch bar 27, and the rail 5 has a similar notch 31 to receive the other end of the latch bar. Thus the latch bar 27 can engage notches in the rails 4 and 5 to hold the metal frame 22 and its contained colored glass pane 25 in either raised or lowered position, that is, to either cover or uncover the clear glass pane 2. The operator depresses the latch bar 27 to move it out of the notches 30–31, thus permitting the frame 22 to slide freely either upwardly or downwardly in the rails 4–5. The frames 22 are each provided with projecting fingers 32 and 33 which provide a means of spacing the frames 22 when they are both in the raised position, thereby enabling the operator to more easily place his fingers on the latch bar 27 for the purpose of unlatching this bar when it is desired to move one or both of the frames 22. The flat spring 26 permits this vertical movement of the latch bar 27, and also returns the latch bar to its raised position as soon as pressure is released from the bar.

In the modification shown in FIGURES 9 and 10, the frame member 34 is changed from the frame 22 previously described. In FIGURES 9 and 10 the frame 34 is again rectangular in shape and consists of a U-shaped structure, including a transverse bar 35 at one end and two arms 36–37, which arms are joined at their outer ends to the lower rectangular part 38 of the frame. Thus the upper part of the frame, including the bar 35 and the arms 36–37, will tend to be spring pressed upwardly to thus tend to press the bar 35 into the latch notches 30–31 when the frame is in one adjusted position, that is, the natural spring of the metal will accomplish this spring action. A glass pane 39 is held in the frame 34 in the same manner as the glass panes 25 previously described. To hold the glass pane 39 in the frame 34, the arms 36 and 37 are each provided with a small spring finger 40–41 which engages the glass pane and holds that pane downwardly in the frame 34 to prevent accidental dislodgement of the glass pane.

Having described my invention, I claim:

1. In a welder's helmet having a sight opening therein through which the user may see,
   spaced tracks detachably mounted in said helmet,
   a frame mounted in said tracks and a transparent window mounted in said frame,
   a latch bar mounted in said frame movable relative to the track,
   spring means urging the latch bar towards the track, and means in the track engageable by said latch bar.

2. In a welder's helmet having a sight opening therein through which the user may see,
   spaced tracks detachably mounted in said helmet,
   a frame mounted in said tracks and a transparent window mounted in said frame,
   a latch bar mounted in said frame movable relative to the track,
   spring means urging the latch bar towards the track,
   means in the track engageable by said latch bar,
   said spring means comprising a flat metallic spring positioned within the frame, said spring bearing against the latch bar.

3. In a welder's helmet having a sight opening therein through which the user may see,
   spaced tracks detachably mounted in said helmet,
   a channel-shaped frame slidably mounted in said tracks, the end of said frame extending transversely of the tracks comprising a latch bar,
   said frame being formed of spring material to press the latch bar portion thereof towards the tracks, and means on the tracks engageable by the latch bar to hold the frame in adjusted position,
   and a transparent window mounted in said frame.

References Cited by the Examiner

UNITED STATES PATENTS

| | | | |
|---|---|---|---|
| 532,935 | 1/1895 | Woolery | 20—52.6 X |
| 681,379 | 8/1901 | Tidd | 20—52.6 X |
| 1,833,257 | 11/1931 | Norton | 2—8 |
| 1,877,024 | 9/1932 | Norton | 2—8 |
| 1,990,369 | 2/1935 | Boyd | 2—8 |
| 2,277,090 | 3/1942 | Feiler | 2—8 |
| 2,370,499 | 2/1945 | Shields | 2—8 |
| 2,483,061 | 9/1949 | Omans | 292—80 |
| 2,719,972 | 10/1955 | Kelly | 2—8 |
| 3,086,213 | 4/1963 | Crozat et al. | 2—8 |

FOREIGN PATENTS 1,045,939   7/1953   France.

JORDAN FRANKLIN, *Primary Examiner.*

J. R. BOLER, *Assistant Examiner.*